Inventor:
Edwin S. Segard

Dec. 2, 1947.  E. S. SEGARD  2,432,077
POWER TRANSMISSION MECHANISM
Filed Sept. 20, 1940  7 Sheets-Sheet 5

Inventor:
Edwin S. Segard

Patented Dec. 2, 1947

2,432,077

UNITED STATES PATENT OFFICE 2,432,077

POWER TRANSMISSION MECHANISM

Edwin S. Segard, San Francisco, Calif.

Application September 20, 1940, Serial No. 357,557
Section 10, Public Law 690, August 8, 1946
Patent expires September 20, 1960

5 Claims. (Cl. 74—336)

This invention relates to improvements in power transmission mechanisms.

It is a device for the transmission of power from a power source such as an engine or a motor, to the vehicle, conveyance or machine to be propelled by the power source. It is a power transmission in which the power from the power source to the vehicle, conveyance or machine propelled, is delivered through a series of speed changes through the automatic interposition of constantly meshed gear trains of varying reduction ratios, which interposition of the various gear trains is automatically effected through the coaction of the velocity of rotation, and the torque resistance of the vehicle, conveyance or machine propelled, and the torque delivered by the power source, the action of the velocity of propulsion, the torque resistance of the vehicle, conveyance or machine propelled, and the torque delivered by the power source being inter-opposed and inter-controlled in such manner that the velocity responsive means never escapes the opposition or the control of the torque responsive means and the torque responsive means never escapes the opposition and control of the velocity responsive means.

A principal object of the invention is to produce power transmissions with constantly meshed gears and constant flow of power automatically through a series of speed changes or gear ratios in such manner as to enable the power source to constantly operate within its economical range of velocity and torque capacity.

Another object is to provide such a power transmission mechanism, wherein the change of gear ratio between the prime mover and the driven device may be accomplished quickly and with a minimum of effort.

Other objects and advantages reside in details of design and construction which will be more fully disclosed in the following description and in the drawings wherein like parts have been similarly designated and in which.

In order to disclose an operative reduction to practice of the present invention, the accompanying drawings, which are made a part hereof, will be described in some particularity. However, this disclosure is intended to present a typical example and should not be construed to express or to imply any limitation to this invention, the scope of which is, in reality, measured by the appended claims.

Figure 1:
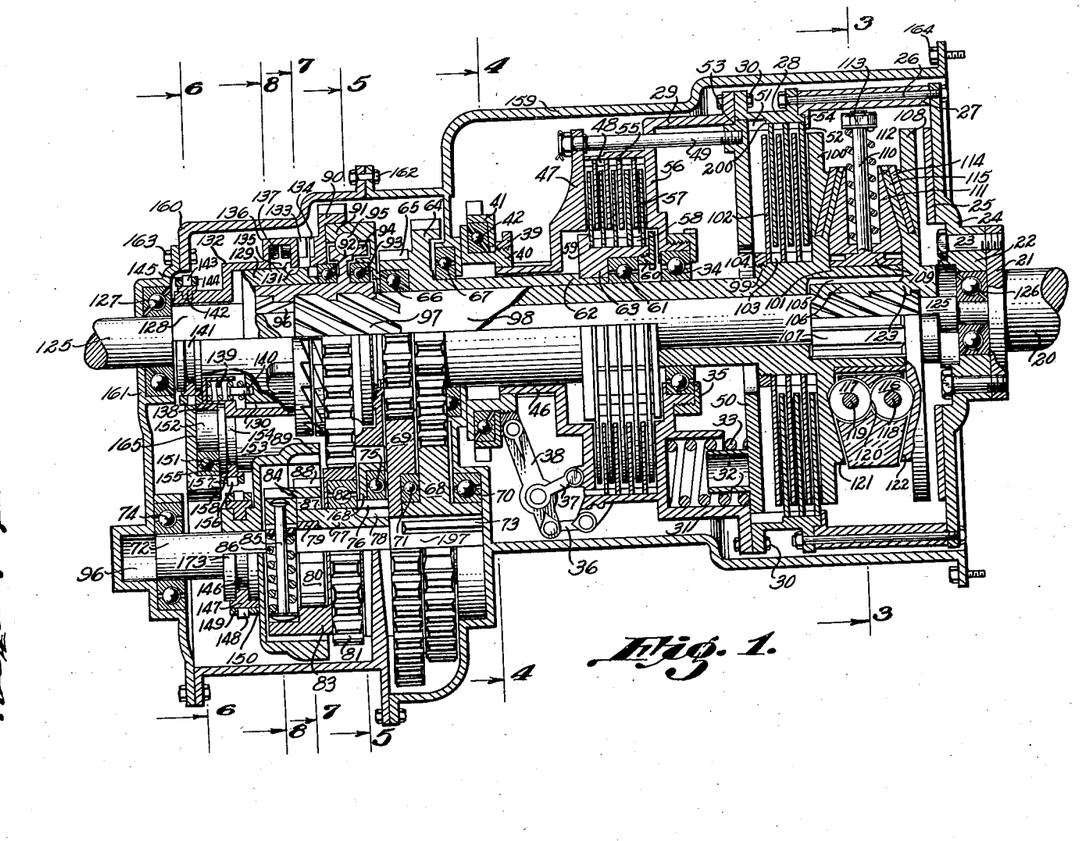
Figure 1 is a longitudinal sectional view of a transmission mechanism that embodies the present inventive concept.

In the drawings, Figure 1 illustrates a preferred embodiment of my invention. The numeral 20 denotes the rear end of the driving shaft of a prime mover, such as an automobile engine or the like. Flange 21 integral therewith, is bolted to hub 22 by bolts 23. On the rear surface of disk 24 of hub 22, integrally attached, is friction disk 25. Disk 24 through bolts 26 is attached to the clutch housing comprised of housing members 27, 28 and 29. Housing members 28 and 29 are joined by bolts 30. In housing member 29 are nine equidistant spring-containing recesses 31 and spring guides 32 carrying springs 33. Housing member 29 is mounted on bearing 34, which bearing is held in its recess by retainer 35.

Linkage members 36, 37 and 38 connect the clutch housing member 29 to member 39 of the clutch release collar mechanism comprising members 39, 40 and 41 and thrust bearing 42. Clutch release mechanism member 41 is connected to a selectively operable clutch release mechanism not shown in Figure 1 but illustrated elsewhere.

Clutch release collar member 40 is slidably mounted on splined tubular shaft 46 of pressure plate disk 47, and pressure plate disk 47 is slidably mounted on splines 48 of which there are several on the inner circumference of clutch housing member 29. Pressure plate disk 47, through bolt 49, is connected to pressure plate 50. Pressure plate 50 is splined in housing member 28 on splines 51.

Clutch plates 52, of which there are three, are also mounted in housing member 28 on splines 51. Clutch plates 52 and pressure plate 50 are retained in housing member 28 by retaining flanges 53 and 54. Clutch plates 55, of which there are four, are mounted on splines 48 of housing 29, and pressure disk 56 of clutch housing member 29 is integral therewith. Clutch plates 57, of which there are five, are mounted on splines 58 of hub 59 and are held thereon by retaining nut 60. Hub 59 is mounted on bearing 61 and is connected to tubular shaft 62 in driving relation therewith, through a splined connection 63.

Gear 64 and gear 65 are integral with tubular shaft 62. The rear end of shaft 62 is mounted on thrust bearing 66 and just forward of gear 64 in bearing 67. Gear 64 meshes with gear 68 and gear 65 meshes with gear 69. Gear 68 is rotatably mounted in bearings 70 and 71 and is connected in driving relation with slidable shaft 72 through splines 73 on the enlarged forward end of slidable shaft 72. Slidable shaft 72 at its rear end is slidably mounted in bearing 74 and its forward end slidably mounted in the splined hub of gear 68. Gear 69 is mounted on bearing 71 and in bearing 75, which bearing 75 is mounted in recess 168. Gear 69 is connected with collar 77 through splined connection 78, which collar 77 containing bushing 79 is rotatably but not slidably mounted on slidable shaft 72. Notched wheel 80 is integral with collar 77. Gear 81 is mounted on bearing 82, which bearing is mounted on collar 77. Hub 83 of gear 81 contains centrifugally operative dog 84, which dog carries bolt 85 and springs 86, of which there are two each, and is provided with teeth 87 and 88 best shown in Figure 8.

Gear 81, when at rest and when rotating below a predetermined speed, is connected in driving relation with notched wheel 80, Figure 7, through tooth 87 of dog 84. Wheel 89, which is an internally notched wheel, is mounted integrally on slidable shaft 72 and, therefore, is in driving relation with gear 68 through splined connection 73 of slidable shaft 72. Internally notched wheel 89, when rotating above a predetermined speed, is connected in driving relation with gear 81 through tooth 88 of dog 84.

Gear 81 meshes with gear 90, which gear 90 comprises two elements, gear 90 and rim section 91 which is riveted to gear 90. Gear 90 and rim section 91 are mounted on bearings 92 and 93. Rim section 91, below predetermined speeds, is connected in driving relation unidirectionally with a hub section 94 through balls 95, of which there are four, best shown in Figure 5. Bearings 92 and 93 are mounted on the outer surface of the hub of hub section 94. Hub section 94 on its inner surface carries female screw threads 96, which threads mesh with male screw threads 97 on tubular shaft 98.

Tubular shaft 98, on its forward end, is integral with hub 99, disk 100 and tubular shaft 101. On hub 99 of tubular shaft 98 is mounted clutch plates 102 in driving relation through splines 103 and are held there by retaining nut 104. Tubular shaft 101, which is the forward end of tubular shaft 98, carries splines 105 on its inner surface. Hub 106, splined on its outer surface as indicated at 107, is slidably mounted in splines 105 of tubular shaft 101. Hub 106 is integral with disk 108.

On the outer surface of tubular shaft 101 is mounted slidably hub 109, and bolts 110, of which there are three, are integral with hub 109. On bolts 110 are slidably mounted wedge-shaped weights 111, and on bolts 110, acting against weights 111, are springs 112 retained by nuts 113. Weights 111 are in slidable contact with disks 100 and 108 through tongues 114 integral with weights 111 and lips 115 integral with disks 100 and 108. In weights 111 are mounted two pairs of rollers 116 and 117 on bolts 118 and 119, respectively, which pair of rollers contact each other at point 120 and contact disks 100 and 108 on race 121 and race 122, respectively, which are converging inner surfaces of said disks 100 and 108. Hub 106 on its inner surface carries female screw threads 123, which engage corresponding male screw threads 124 on the forward end of shaft 125. The forward end of driven shaft 125 is journalled in thrust bearing 126 mounted in hub 22 of disk 24.

The rear end of shaft 125 is journalled in thrust bearing 127, just forward of which is thrust collar 128 integral with said shaft 125. Flange 129, integral with thrust collar 128 and driven shaft 125, carries splines 130 on its outer surface and recesses 131, of which there are three. Inside flange 129 rides rotatably the hub of hub section 94. Slidably mounted on splines 130 is ratchet clutch-carrying housing 132 with ratchet teeth 133, which teeth 133, when moved forward, grasp ratchet teeth 134 on rear surface of gear 90.

Mounted in ratchet clutch-carrying housing 132 are plungers 135, actuated by springs 137 in recess 136, of which there are three. In housing 132 there is also mounted in recess 138, spring 139 on guide 140. On the rear hub end of ratchet clutch-carrying housing 132 is groove 141, in which groove is mounted shifting collar 142, which collar carries pivots 143. Pivots 143 are mounted in slots 144 of shifting lever arm 145. On the rear hub end of internally notched wheel 89 is groove 146, in which groove is mounted shifting collar 147 which carries pivots 148. Pivots 148 are mounted in slots 149 of shifting lever 150.

Bearing 151 journals a shaft 152, on which shaft is mounted rotatably and slidably hub 153 integral with the reversing gear, which reversing gear cannot be seen in Figure 1. At the rear end of hub 153 is groove 154, in which groove is mounted shifting collar 155 which carries pivots 156. Pivots 156 are mounted in slots 157 of shifting lever 158.

The assembly above enumerated is mounted in a support and enclosing casing comprising members 159, 160 and 161 joined by bolts 162 and 163, which casing is attached to the motor block by tap screws 164. Bearing 151 is mounted in recess 165 in casing member 160. The forward end of shaft 152 is mounted in bearing 166 in recess 167 of casing member 159 (bearing 166 and recess 167 cannot be seen in Figure 1 because they are below structures appearing in the drawing).

Figure 2:
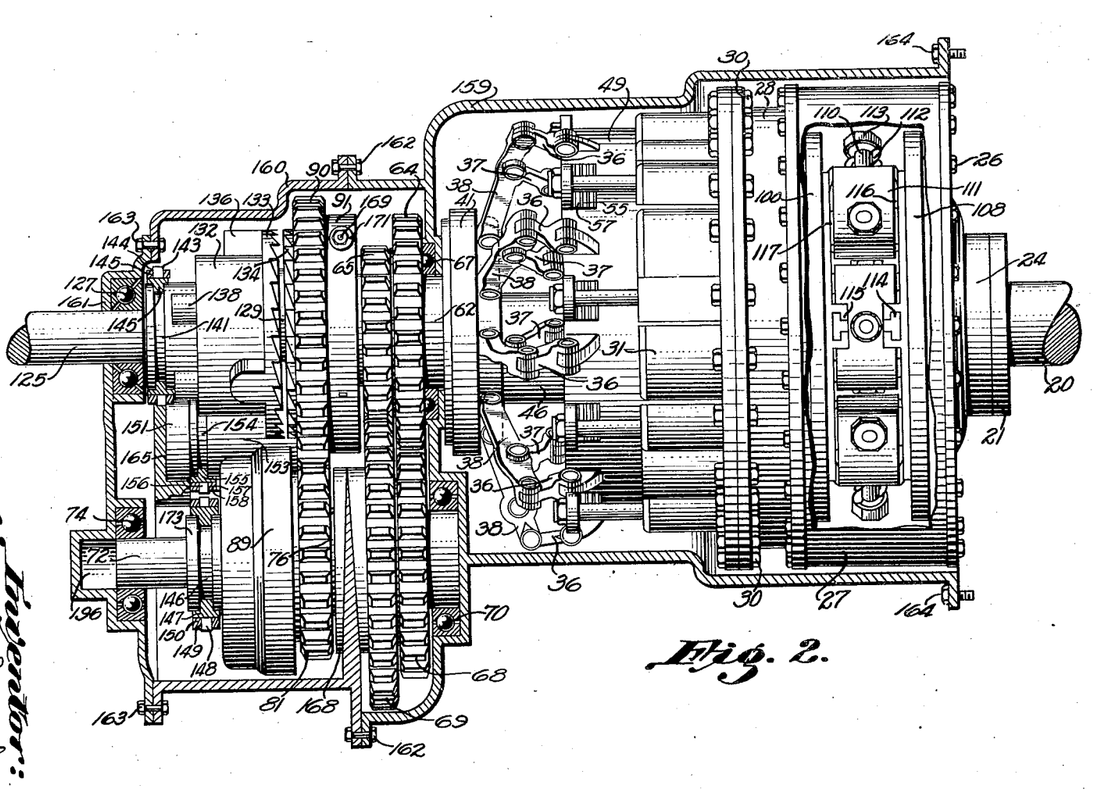
Figure 2 is a plan view, partially in section, of the mechanism illustrated in Figure 1.

Figure 2 illustrates a top plan of the mechanism shown in Figure 1 and hereinbefore described, with the top half of the enclosing and supporting casing in section, and a fragmentary view of the velocity responsive torque controlled means.

Figure 3:
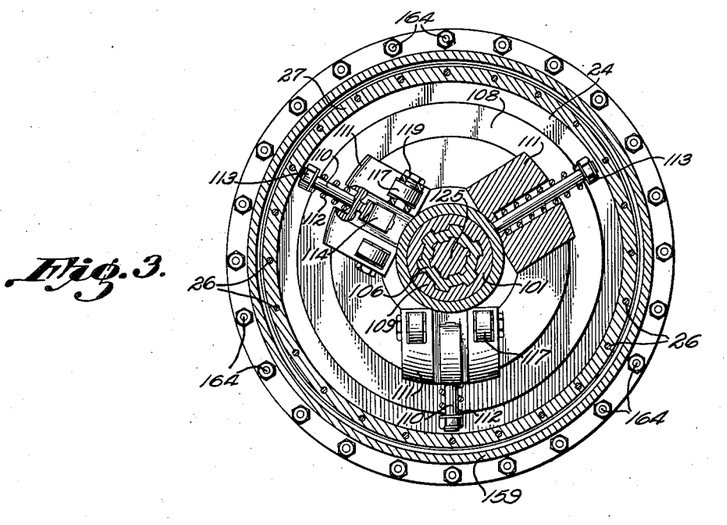
Figure 3 is a cross sectional view taken along the line 3—3 of Figure 1.

Figure 3 shows a section taken on the line 3—3 of Figure 1, looking in the direction of the arrows and disclosing the velocity responsive means.

Figure 4:
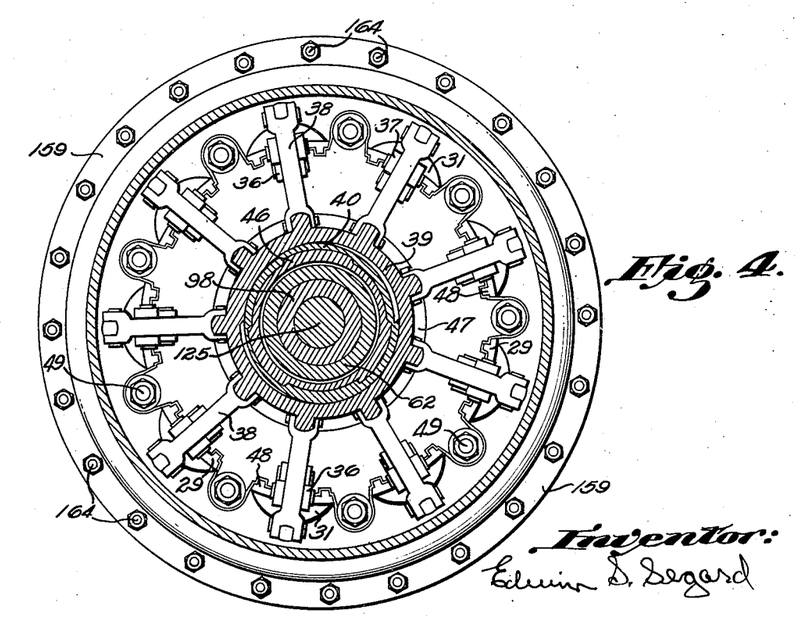
Figure 4 is a cross sectional view taken along the line 4—4 of Figure 1.

Figure 4 is a section taken on the line 4—4 of Figure 1, looking in the direction of the arrows, showing casing 159 in elevation forward of line 4—4 in Figure 1, and in section on line 4—4 of Figure 1, showing clutch casing member 29 and pressure plate disk 47, release levers 38, linkage 37 and 36 in elevation, members 39 and 40 of clutch release collar mechanism, shaft 46, shaft 62, shaft 98 and driven shaft 125 in section.

Figure 5:
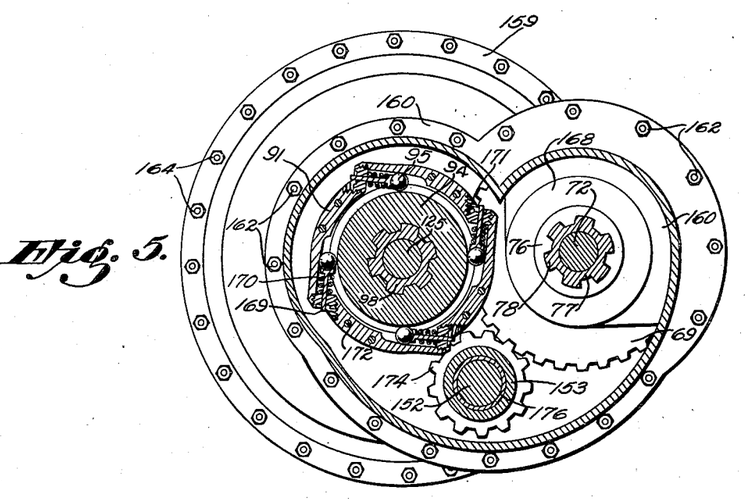
Figure 5 is a cross sectional view taken along the line 5—5 of Figure 1.

Figure 5 is a section on line 5—5 of Figure 1 looking in the direction of the arrows, showing casing member 159 in elevation and casing member 160 in elevation forward of line 5—5, and in section on line 5—5 of Figure 1, and gear 69 in elevation, collar 77 and shaft 72 in section and the unidirectional clutch rim section member 91 in section, and balls 95 in elevation and hub section 94 of the unidirectional clutch mechanism in section, together with shaft 98 and driven shaft 125 in section, gear 174 (the forward half) of the reversing gear in elevation, reversing gear hub 153 in section, bushing 176 in section and shaft 152 in section.

Figure 6:
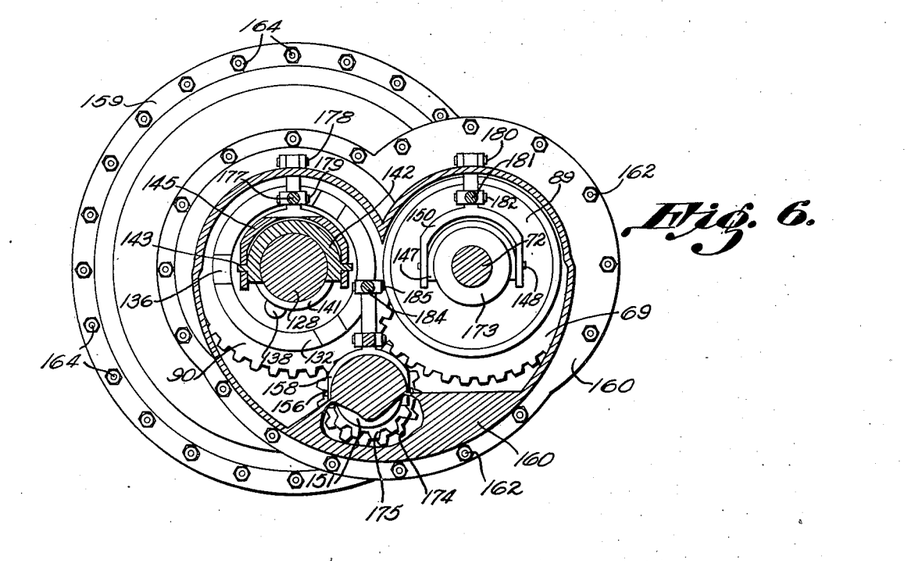
Figure 6 is a cross sectional view taken along the line 6—6 of Figure 1.

Figure 6 illustrates casing member 159 in elevation and casing member 160 in elevation forward of line 6—6 of Figure 1 and in section on line 6—6 of Figure 1, together with gear 90, gear 69, the reversing gear comprising gears 174 and 175 (which are cast integral with hub 153, which hub cannot be seen in this figure) and bearing 151 in elevation, and the shiftable means mounted on thrust shoulder 128, shaft 72 and hub 153, respectively (hub 153 cannot be seen in Figure 6).

The shiftable means mounted on thrust shoulder 128 being shown partly in elevation and partly in section and comprising collar 142, pivots 143 thereof and lever 145, which lever 145 is pivoted on bolt 178 in casing member 160 and carries pull rod 177 which is pivoted in lever 145 by bolt 179.

The shiftable means mounted on shaft 72 is shown in elevation and comprises shifting collar member 147 and pivots 148 thereof and lever 150, which lever is pivoted in casing member 160 on bolt 180. Lever 150 carries pull rod 181 which is pivoted in lever 150 by bolt 182.

The shiftable means mounted on hub 153 is fragmentarily shown in elevation and comprises collar 155, pivots 156 thereof and lever 158, which lever 158 is pivoted in a fulcrum member 183 integral with casing member 160 and is shown in section. Lever 158 on its upper end carries pull rod 184 which is pivoted on bolt 185 in lever 158.

Figure 7:
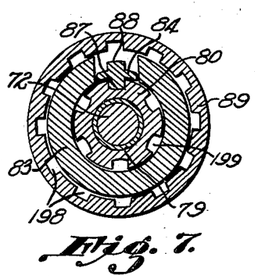
Figure 7 is a partial sectional view taken along the line 7—7 of Figure 1 and illustrating certain components of the device.

Figure 7 shows in section, the following members: internally notched wheel 89, dog 84, tooth 88 of dog 84, tooth 87 of dog 84, hub 83 of gear 81, externally notched wheel 80, bushing 79 and shaft 72.

Figure 8:
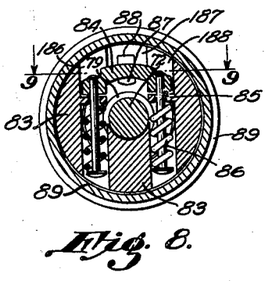
Figure 8 is a partial sectional view taken along the line 8—8 of Figure 1, illustrating certain components of the mechanism.

Figure 8 shows the external portion of internally notched gear 89 in elevation and the rear flanged portion of internally notched gear 89 in section and dog 84 in section, tooth 88 and tooth 87 of dog 84 in elevation, bolts 85 in elevation and springs 86 in section and elevation and hub 83 of gear 81 in section and showing externally notched gear 80 in elevation, together with bushing 79 in elevation and in elevation the recesses 186, 187 and 188 in the hub 83 of gear 81 (in which recesses operate dog 84, bolts 85 and springs 86) and shaft 72 in section.

Figure 9:
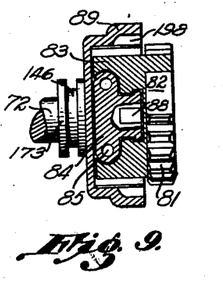
Figure 9 is a fragmentary view illustrating certain details shown in Figure 1, in a top or plan view.

Figure 9 is a fragmentary detail combination elevation and section drawing, the section portions of which show a section through Figure 8 on line 9—9 looking in the direction of the arrows. The drawing comprises the following countershaft assembly members shown in Figure 1 and Figure 8: gear 81, hub portion 83 of gear 81, dog 84, tooth 88, bolts 85, internally notched wheel 89, hub 173, the rear end of internally notched wheel 89 carrying groove 146, and shaft 72.

Figure 10:
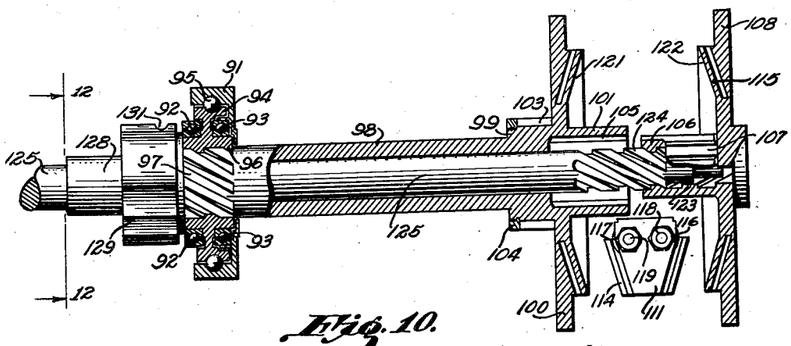
Figure 10 is a fragmentary longitudinal section of certain details shown in Figure 1.

Figure 10 illustrates the velocity responsive torque controlled mechanisms, showing shaft 125, thrust collar 128, flange 129 with recess 131, rim section 91 of the unidirectional clutch mechanism, hub section 94 of the unidirectional clutch mechanism, tubular shaft 98 with male screw threads 97, tubular shaft 101 with spline 105, hub 106 with female screw threads 123, pressure disks 100 and 108 carrying lips 115 and races 121 and 122 and weight 111, showing tongue 114, rollers 116 and 117, tap screw shafts 118 and 119.

Figure 11:
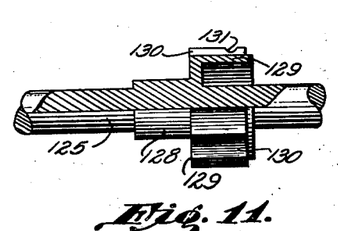
Figure 11 is a fragmentary view, partially in section, of certain details shown in Figure 10.

Figure 11 discloses the integral structure of driven shaft 125, thrust collar 128, flange 129 and splines 130 and recess 131.

Figure 12:
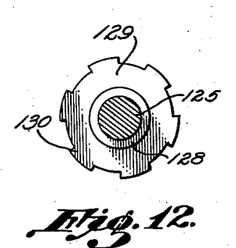
Figure 12 is a sectional view taken along the line 12—12 of Figure 10.

Figure 12 illustrates driven shaft 125, thrust collar 128, rear face of flange 129 and splines 130.

Figure 13:
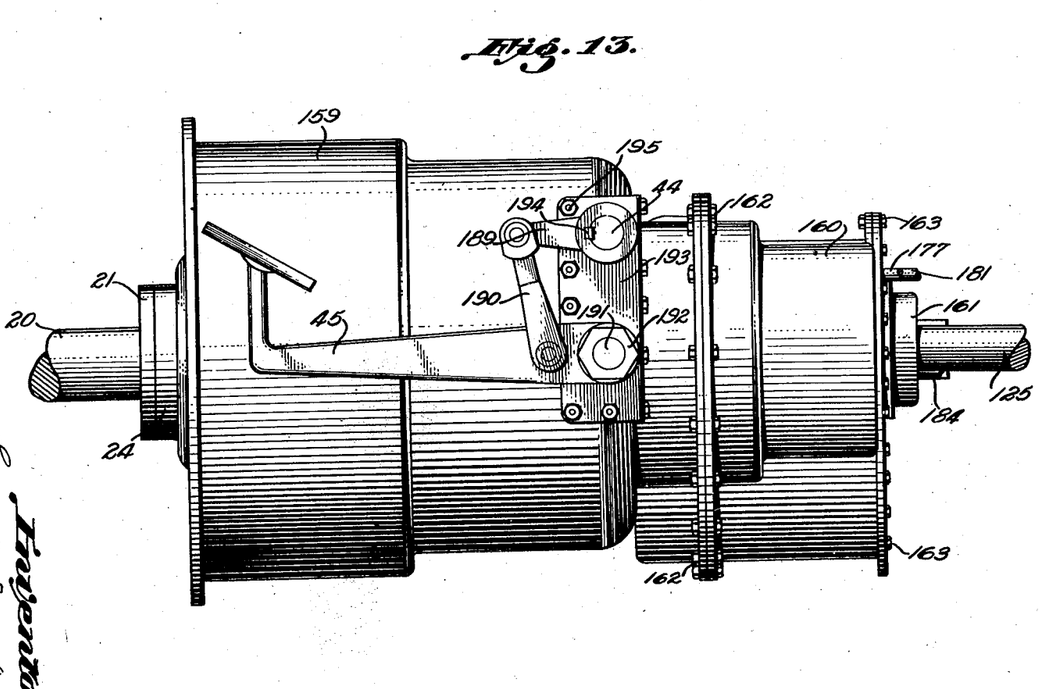
Figure 13 is an exterior elevation of the mechanism illustrated in Figures 1 and 2 and showing the same enclosed in a suitable housing.

Figure 13 shows the enclosing casing and the clutch pedal assembly comprising pedal 45, link 190, lever 189, key 194, clutch release shaft 44, pivot 191, retaining nut 192, clutch assembly window cover 193 retained by tap screws 195.

Figure 14:
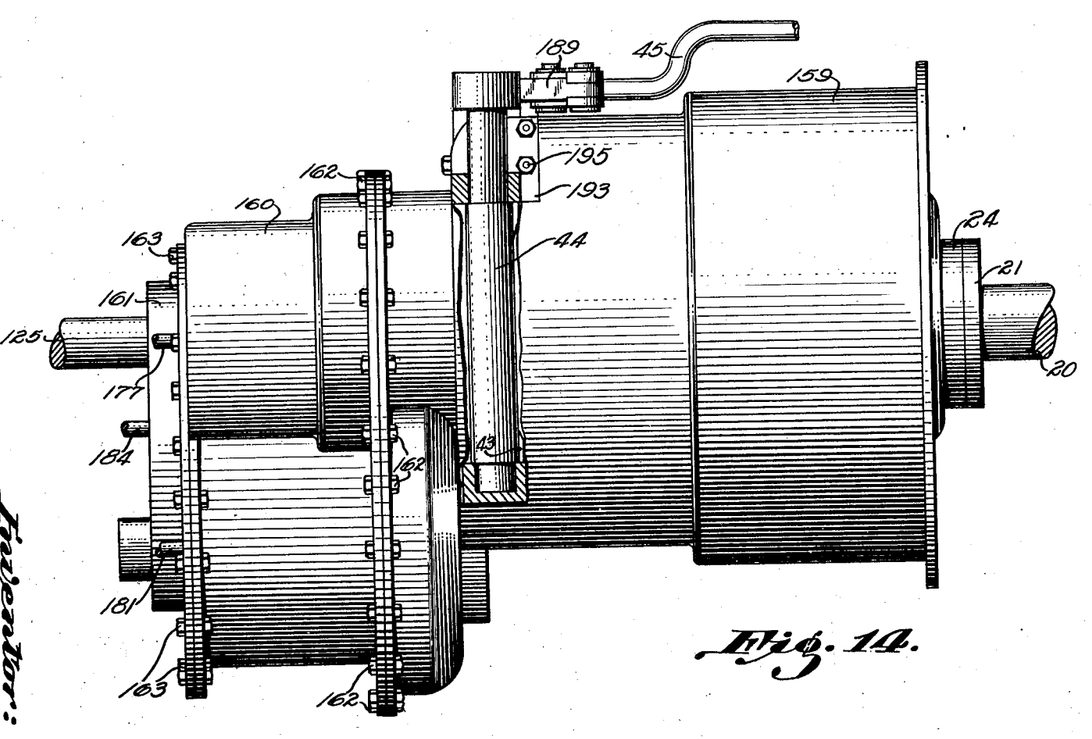
Figure 14 is an exterior plan view of the mechanism illustrated in Figure 2, as it would appear enclosed in a suitable housing, a portion of which housing is broken away to show certain control features.

Figure 14 illustrates the enclosing casing and the clutch pedal assembly, together with a view through a cutaway portion of the enclosing casing through which can be seen clutch release lever 43 and clutch release shaft 44 integral with clutch release lever 43.

*Operation of the device when torque is supplied progressively increasing the rate of rotation*

Assuming that the device shown in Figure 1 is installed in a vehicle or machine in such manner that shaft 20 is the rear end of the crankshaft of the motor or of the driving shaft of whatever power source is being utilized and that the direction of rotation of the power source be counter-clockwise directional when viewed from the rear, then the device will operate in the following manner: shaft 20 being set in rotation, rotates in unison with it by reason of integral construction the following elements, flange 21, disk 24, the clutch housing comprising housing members 27, 28 and 29, friction disk 25, clutch plates 52, pressure plate 50, pressure disk 56 with its hub and bearing retainer 35, clutch plates 55, pressure plate disk 47, the clutch release collar mechanism comprising members 39, 40, levers 38, linkage 37 and 36, all of which structures revolve on bearing 34, which serves to keep the aforementioned clutch housing in alinement with shaft 20.

With the foregoing structures attaining a sufficient speed of rotation to enable the power source to deliver sufficient torque to pull the vehicle, pressure on clutch pedal 45, Figure 13, which has been holding clutch pressure plate 47 in the position of release through clutch pedal shaft 44, clutch release lever 43 and clutch release collar mechanism members 41, 42, 40 and 39, is gradually released. This release of pressure on clutch pedal 45 permits springs 33, acting on pressure plate 50, to move pressure plate 47 through the intermediary of bolts 49, which movement of pressure plate 47, it being splined in housing member 29 on splines 48, together with clutch plates 55, puts into operation the friction plate clutch mechanism comprising pressure plate 47, clutch plates 57 and clutch plates 55 and pressure plate 56.

Clutch plates 57 being mounted on splines 58 of hub 59 and retained thereon by retaining nut 60, are in driving relation with tubular shaft 62 through splines 63, and therefore cause tubular shaft 62 to rotate in unison with shaft 20 and the clutch housing at the moment the aforementioned clutch thus becomes engaged.

Tubular shaft 62 being integral with gears 64 and 65, causes gears 64 and 65 to likewise rotate in unison with the clutch housing and shaft 20. Gear 64 rotates gear 68 and gear 65 rotates gear 69. Gear 68 being in driving relation with shaft 72 through spline connection 73 on the enlarged forward portion of shaft 72, rotates shaft 72 at a speed commensurate with the circumferential measurement of gear 64 and gear 68.

Gear 65 meshing with gear 69, rotates gear 69 at a speed commensurate with the circumferential measurements of gear 65 and gear 69, and internally splined hub 76 of gear 69, being in driving relation with collar 77 through spline 78, rotates collar 77 in unison with said gear 69. Collar 77, being rotatably mounted on shaft 72, on bushing 79, is integral with notched wheel 80.

Notched wheel 80, below a predetermined speed, is connected in driving relation with gear 81 through tooth 87, Figure 7, of dog 84, by virtue of dog 84 being urged toward the center of its rotation by springs 86 through bolt 85 because the mechanism, dog 84, bolt 85 and spring 86, is slidably mounted in the hub of gear 81. Since gear 81 is in driving relation with gear 69, as just described, and meshes with gear 90, it rotates gear 90 at a speed commensurate with the circumferential measurements of gear 81 and gear 90.

Gear 90 being constructed integrally with rim section 91, begins to rotate rim section 91 in counter-clockwise direction at the moment of the engagement of the friction clutch above described. When the rim section 91 begins to rotate in counter-clockwise direction, balls 95 which are acted upon by plungers 169 through the urge of springs 170, Figure 5, become impinged between rim section 91 and hub section 94 in the race as shown in Figure 5. This impingement of balls 95 in the race as shown in Figure 5, causes hub section 94, at once, to rotate in unison with rim section 91, resulting in integral driving relation unidirectionally between gear 90 and female screw threads 96 on the inside of hub section 94. Female screw threads 96 inside hub section 94 meshing with male screw threads 97 on the outer surface of the rear end of shaft 98, cause shaft 98 to be driven in counter-clockwise direction and to be urged forward, i. e., to the right as viewed in Figure 1, with a force proportional to the pitch of screw threads 96 and 97.

Tubular shaft 98 is rotated in counter-clockwise direction and is integral with tubular shaft 101 and carries splines 103 on which splines are mounted clutch plates 102. Just forward of clutch plates 102 is pressure disk 100, also integral with shaft 98. Tubular shaft 101, integral with 98, as stated, is splined on its inner surface at 105.

In splines 105 rides hub 106, which hub 106 at its forward end is integral with pressure disk 108. Hub 106, in driving relation with tubular shaft 101, through splines 105, is rotated in counter-clockwise direction in unison with tubular shaft 98.

Hub 106 on its inner surface carries female screw threads 123, which engage male screw threads 124 of driven shaft 125, and therefore hub 106 rotates driven shaft 125 in counter-clockwise direction and is itself urged towards the rear, i. e., to the left as viewed in Figure 1, by a force proportional to the pitch of said screw threads 123 and 124, by reason of the fact that driven shaft 125 is prevented from moving forward by the hub of hub section 94 operating against flange 129 and thrust collar 128 with an equal force.

As a consequence of the driving relationships above described, it follows and will be readily seen that driven shaft 125 is now rotating at a speed below the speed of rotation of driving shaft 20 in accordance with the gear ratios obtaining in the gear train comprising gear 65, gear 69, gear 81 and gear 90, and that tubular shaft 98 is being urged forward, i. e., to the right as viewed in Figure 1, and hub 106 is being urged rearward, i. e., to the left, by forces proportional to the pitch of screw threads 96 and 97 and the pitch of screw threads 124 and 123, respectively.

Pressure disks 100 and 108 being integral with tubular shaft 98 and hub 106, respectively, are being urged towards each other by the amount of the same respective forces just described. Pressure disks 100 and 108 on their surfaces, facing each other, are constructed with inclined plane faces, between which are mounted weights 111 carried on bolts 110, which bolts are integral with hub 109, which hub is slidably mounted on tubular shaft 101. Springs 112 urge said weights 111 toward their common axis of rotation. Weights 111 being radially slidable between converging inclined surfaces of pressure disks 100 and 108, rotate in unison with tubular shaft 98 and pressure disks 100 and 108 because of tongue 114 and lip 115, and thereby control the axial positions and relationship of the pressure disks 100 and 108.

Weights 111, through the intermediary of rollers 117 and 116 operating against the inclined faces of disks 100 and 108, urge said pressure disks 100 and 108 away from each other by an amount of force proportional to the mass of the weights and the rate of rotation of driven shaft 125 by virtue of the action of centrifugal force.

Because of the mechanical advantage inherent in the gear train comprising gear 65, gear 69, gear 81 and gear 90, and the pitch and direction of screw threads 97 and 124, the torque resistance of driven shaft 125 is greater than the torque supplied by the power source, and it will be readily seen that below a predetermined speed level the force urging pressure disks 100 and 108 towards each other is much greater than the centrifugally inspired force urging pressure disks 100 and 108 away from each other by the action of weights 111.

With an increase in the rate of rotation of driven shaft 125, due to the ability of the power source to accelerate, the ground speed of the vehicle reaching a point where the mechanical advantage of the gear train comprising gear 65, gear 69, gear 81 and gear 90, is no longer necessary, then momentary deceleration of the motor causes release of the pressure in notch 199 of wheel 80 against tooth 87 of dog 84, which release of pressure permits the centrifugal force acting on dog 84 to overcome the action of springs 86 with the result that dog 84 moves away from the center of rotation and instantaneously tooth 88 of dog 84 becomes seated in the immediately oposite notch 198 of internally notched wheel 89. Internally notched wheel 89 is mounted integrally on shaft 72 and therefore is in driving relation with gear 68, and consequently causes gear 81 to rotate in unison with gear 68, whereby gear 90 at once rotates in accordance with the ratio of rotation obtaining in the rear train comprising gear 64, gear 68, gear 81 and gear 90.

Coincidental with the momentary deceleration of the power source, the force urging pressure disks 100 and 108 towards each other, becomes interrupted by reason of the momentary cessation of torque transmittal through screw threads 96 and 97 and 123 and 124, respectively, which cessation of torque transmittal permits weights 111 to move away from the center of rotation, pushing pressure disks 100 and 108 away from each other by a force proportional to the centrifugal force acting on weights 111 and the inclined plane relationship between rollers 116 and 117 and pressure disks 100 and 108, respectively.

The pushing apart of pressure disks 100 and 108 causes said pressure disk 108 to come in contact with friction surface 25 and causes said pressure disk 100 to effect engagement of clutch plates 52 and 102 between pressure plate 50 and pressure disk 100, which engagement tends momentarily to urge shaft 98 to rotate in unison with the clutch housing and driving shaft 20. Gear 90, through the engagement of tooth 88 of dog 84 in the immediately opposite notch 198 of internally notched wheel 89, having come to rotate in accordance with the gear ratio of gears 64, 68, 81 and 90, causes resumption of torque transmittal through screw threads 96 and 97 and 123 and 124. Immediately upon the resumption of acceleration of the motor after the momentary deceleration, the resumption of torque transmittal through screw threads 96 and 97 and screw threads 123 and 124 causes the torque inspired force urging pressure disks 100 and 108 towards each other to be resumed, which immediately urges weights 111 towards the center of rotation back to their original position, thereby completely preventing the tendency to engagement between pressure disk 100, clutch plates 52 and 102 and pressure plate 50, and between pressure disk 108 and friction surface 25.

The torque inspired force urging pressure disks 100 and 108 towards each other and urging weights 111 towards the center of rotation, is now proportional to the torque of the gear train transmitting it, which is, of course, lessened proportionately to the lessened mechanical advantage of the gear train comprising gears 64, 68, 81 and 90. Further acceleration of the motor causing an increase in the centrifugal force operating on weights 111, increases the force by which weights 111 are urging pressure disks 100 and 108 away from each other.

As the acceleration of the vehicle with the consequent lowering of torque resistance of driven shaft 125, by virtue of the lessening of the inertia of the vehicle and/or changes in terrain over which the vehicle is operated, the torque resistance of driven shaft 125 is reduced, which results in consequent further reduction of the force urging pressure disks 100 and 108 towards each other because of the decrease of the torque transmittal through screw threads 96, 97, 123 and 124. This causes the force urging pressure disks 100 and 108 towards each other to become insufficient to oppose the force with which weights 111 urge pressure disks 100 and 108 away from each other.

With the torque inspired force urging pressure disks 100 and 108 towards each other insufficient to oppose said centrifugally inspired force with which weights 111 are urging pressure disks 100 and 108 away from each other, said pressure disks 100 and 108 move apart as the torque resistance drops or the centrifugally inspired force increases with the result that pressure disk 100 moves rearward sufficiently to cause engagement of clutch plates 52 and 102 between pressure plate 50 and pressure disk 100, and pressure disk 108 comes in contact with friction surface 25, which engagement causes shaft 98 to come to rotate in unison with the clutch housing and driving shaft 20.

Immediately upon this engagement of this centrifugally responsive torque controlled clutch and shaft 98 coming to rotate in unison with the clutch housing and driving shaft 20, hub section 94 begins to rotate at a speed greater than rim section 91, which action immediately releases balls 95 from their position of impingement in the races in the hub section 94 and rim section 91, thereby effecting release of the driving relationship between rim section 91 and hub section 94.

It will be readily seen that now at the speed at which driven shaft 125 and driving shaft 20 are rotating in unison, the driving relationship between driving shaft 20 and driven shaft 125 is a direct drive relationship and that the gear train comprising gear 90, gear 81, gear 68 and gear 64 no longer transmits power.

Furthermore, it will be noted that with the engagement of the centrifugal responsive torque controlled mechanism, weights 111 have moved away from their center of rotation and have come to rest against the inner surface of clutch housing member 27 and springs 33 have been compressed and pressure plate 50 has been pushed backward against retaining flange 53, whereby because of the connection between pressure plates 50 and 47 by virtue of bolts 49, clutch plates 55 and 57 have become disengaged. Therefore, the gear train comprising gear 64, gear 68, gear 81 and gear 90 is no longer being urged to rotate except through the friction present between balls 95, rim section 91 and hub section 94 by virtue of pressure of plunger 169 on balls 95 exerted by springs 170.

It will also be noted that since the momentary deceleration of the motor which released tooth 87 of dog 84 from the notch 199 of externally notched wheel 80 and the consequent severance of driving relationship between gear 69 and gear 81, there has been no transmittal of torque by gear 65 and gear 68 and notched wheel 80, but these members have merely idly rotated in accordance with the gear ratio between gear 65 and gear 69.

With the speed of rotation at the level at present obtaining, no further phenomena transpire. With a further increase in acceleration, when sufficient rate of rotation is attained, the centrifugal force operating on the balls 95 will urge balls 95 outward in their race sufficiently to compress springs 170, thus removing the friction previously obtaining between them and their race in hub section 94, seen in Figure 5.

Therefore, hub section 94 will cease to urge rim section 91 to rotate until rim section 91 decelerates sufficiently for this friction to reappear.

This means that rim section 91 is never urged to rotate above a predetermined level and that level being the rate of rotation sufficient to produce enough centrifugal force acting on the balls 95 to compress springs 170, therefore gear 90, gear 81, gear 69, gear 65, tubular shaft 62, hub 59 and clutch plates 57 are never urged to rotate at a speed greater than that required to produce sufficient centrifugal force to enable balls 95, acting on plungers 169 to compress springs 170 sufficiently to remove friction between balls 95 and the race on the face of hub section 94 while the velocity responsive torque controlled clutch is engaged.

When the vehicle is operating at a speed sufficient to maintain in engagement the velocity responsive torque controlled clutch, or in other words, maintain direct drive or what is conventionally termed "high" gear driving connection, terrain or driving conditions are encountered which increase the torque resistance of driven shaft 125 sufficient to begin to decelerate the motor, then this progressive deceleration of the motor due to this increased resistance of driven shaft 125, decreases the centrifugal force acting on weights 111, thus permitting screw threads 124 of driven shaft 125 to urge pressure disk 108 rearward and in like manner, pressure disk 100 forward by screw threads 97 of shaft 98, which movement of disks 100 and 108 toward each other results in weights 111 being urged towards their center of rotation.

Since weights 111 are urged towards their common center of rotation, centrifugal force is decreased with the result that the force by which these weights oppose the movement of disks 108 and 100 toward each other is decreased.

Decrease of the centrifugal force acting on weights 111 decreases the force which pressure disk 100 is exerting on the forward face of pressure plate 50, which pressure plate 50 is urged forward by springs 33 acting against the rear face of pressure plate 50. It follows, therefore, that as the centrifugal force acting on weights 111 is decreased, the force acting against pressure plate 50 compressing springs 33 decreases proportionately. This is because the force exerted by pressure disk 100 against pressure plate 50, and therefore against springs 33, results from the centrifugal force of weights 111 urging pressure disks 100 and 108 away from each other, it follows, naturally, that decrease in the centrifugal force acting on weights 111 proportionately decreases the force compressing springs 33.

Therefore, when there has been sufficient progression in the decrease of the centrifugal force acting on weights 111, the force of pressure disk 100 against pressure plate 50 is insufficient to maintain compression of springs 33, wherefore pressure plate 50 is moved forward until prevented from moving farther by bolts 49 causing engagement of the manually releasable clutch, just forward of member 47.

It should be noted that the ability of pressure disk 100 to exert force rearward against pressure plate 50 through the intervening clutch plates 52 and 102, is founded upon the fact that pressure disk 108 is in contact with friction surface 25 of member 24 and therefore is incapable of being moved further forward. Because of this, all of the motion of pressure disks 100 and 108 away from each other resulting from weights 111 moving outward on the inclined surfaces of the disks 100 and 108 during the phase of application of the clutch, was necessarily the property of pressure disk 100 only. Consequently, during the phase of decrease of the centrifugal force acting on weights 111, springs 33 opposing rearward motion of pressure disk 100, become capable of overcoming the centrifugal force's rearward motion of pressure disk 100 and therefore, of course, push pressure disk 100 forward.

At the moment that the springs have pushed pressure disk 100 forward sufficiently to allow the said springs to cause engagement of the manually releasable clutch represented by member 47 and the multiple disk clutch just forward thereof, torque delivered by the driving shaft 20 is at once again transmitted to tubular shaft 62 and therefrom on through the intermediate speed gear train.

This torque transmittal through the gear train causes engagement of the unidirectional clutch. Engagement of the unidirectional clutch results at once in the torque delivered to tubular shaft 98 being increased by the mechanical advantage of the intermediate speed gear train. This increase in torque transmitted to and through tubular shaft 98, obviously, increases proportionately the force urging pressure disk 100 forward and pressure disk 108 rearward, i. e., the force urging pressure disks 100 and 108 toward each other.

This increase in the force urging pressure disks 100 and 108 towards each other completely overcomes the centrifugal force operating on weights 111, wherefore weights 111 are forced to their position of release resting on hub 109. Obviously, therefore, the resumption of torque transmittal through the intermediate speed gear train effects prompt release or disengagement of the velocity responsive clutch but does so resiliently because of the integrated relationship with the manually releasable clutch.

The vehicle is now once again operating in intermediate speed or what is commonly termed "second" gear. When at any time while the vehicle is thus operated, conditions of terrain or other causes of increase in the torque resistance of driven shaft 125, slow down the motor to a point where the operator deems it feasible to use the first gear or slow speed driving connection after the motor has been slowed down to the predetermined level at which springs 86 of dog 84 are capable of successfully opposing the centrifugal force operating on dog 84, then the operator obtains the slow speed connection by momentary deceleration of the motor, or momentary application of foot pressure on clutch pedal 45, resulting in release of tooth pressure of notch 198 of internally notched wheel 89 on tooth 88 of dog 84, permitting springs 86 to pull dog 84 towards its center of rotation, promptly seating tooth 87 in notch 199 of externally notched wheel 80. Re-acceleration of the motor or release of foot pressure on clutch pedal 45, immediately after the momentary deceleration of the motor, causes the vehicle to proceed in low speed or "first" gear, from which time on, the terrain and driving conditions permitting, the vehicle may be accelerated up to the speed limit of the motor in exactly the same manner as was described for operation of the device when torque is supplied progressively increasing the rate of rotation.

Having traced the operation from the beginning of rotation of the motor with the vehicle at a standstill up to a predetermined speed, the phenomena occurring while bringing the vehicle to a stop through the medium of applying the brakes of the vehicle will be described.

It will be noted that the pedal controlled clutch has been automatically released since the direct drive relationship has been inaugurated and it is therefore only necessary to hold pedal 45 in the depressed position while bringing the vehicle to a stop by applying its brakes. Immediately upon closing the throttle and thereby causing the compression of the motor to exert decreasing torque, the direction of torque applied through screw threads 96, 97, 123 and 124 is reversed, with the result that this diminishing torque urges pressure disks 100 and 108 away from each other, thereby tending to maintain the centrifugal responsive torque controlled clutch in engagement by a force proportional to the torque of the compression and the pitch of screw threads 96, 97, 123 and 124.

Continued deceleration of the vehicle by the application of the brakes causes a progressive decrease in the centrifugal force actuating weights 111. When the deceleration of the vehicle has progressed near enough to an actual stop to permit spring 112 urging weights 111 towards the axis of rotation with sufficient force to urge pressure disks 100 and 108 towards each other with a force in excess of the amount of the force with which the decreasing torque of the compression of the motor is urging pressure disks 100 and 108 away from each other, then pressure disks 100 and 108 are drawn toward each other by springs 112, and the centrifugally responsive torque controlled clutch is promptly disengaged by this action of springs 112 and severance of the driving relationship between the motor and driven shaft 125 is effected.

As this centrifugally responsive torque controlled clutch releases, springs 33 urge pressure plates 56 and 47 forward, which forward motion is prevented from taking place by the clutch pedal being held in depressed position by the foot pressure of the operator. Therefore, the vehicle stops with the manually operated clutch in release and the motor idling.

Assuming that the vehicle being operated in direct drive, or what is conventionally termed "high" gear, approaches an incline which the driver desires to descend in what is conventionally known as "second" gear, then the device will function as follows: In direct drive or "high" driving connection, the velocity responsive torque controlled clutch mechanism is in engagement, which engagement maintains disengagement of the manually operated clutch mechanism pressure plate 47, clutch plates 55, clutch plates 57 and pressure plate 56. Therefore, the gear train comprising gears 64, 68, 81 and 90, are idling freely, being rotated at a speed which is maintained by the friction on balls 95 in their race between hub section 94 and rim section 91.

At the moment the operator of the vehicle decides to utilize the intermediate or "second" gear for deceleration, he merely exerts a pull on pull rod 177, which rod acting on lever 145 pivoted on pivots 143 of shifting collar 142, moves ratchet clutch-carrying housing 132 forward engaging teeth 133 with teeth 134, permitting plunger 135 to seat in recess 131, holding teeth 133 and 134 in engagement and then applies the brakes of the vehicle, decelerating it to the predetermined level at which the centrifugal force acting on weights 111 is insufficient to maintain compression of springs 33, the expansion of which springs 33 engages the manually controlled clutch comprising pressure plates 47, clutch plates 55 and 57 and pressure plate 56, which engagement resiliently connects the clutch housing and driving shaft 20 in driving relation through the intermediate train gears 64, 68, 81 and 90.

Gear 90 is positively engaged with ratchet clutch housing 132 through teeth 133 and 134 and is connected in driving relation with driven shaft 125, unidirectionally clockwise viewed from the rear, by virtue of the splines 130 between flange 129 of driven shaft 125 and ratchet clutch housing 132. Therefore, the decreasing torque of the compression of the motor retarding gear 90 retards driven shaft 125.

In the event that the incline is sufficiently steep to cause the operator of the vehicle to desire to utilize further the compression of the motor by using the low speed gear train after having thus decelerated the vehicle by use of the intermediate speed gear train, he merely utilizes the brake sufficiently to reduce the vehicle's speed down to the predetermined level at which the centrifugal force acting on dog 84 is insufficient to maintain in compression springs 86, and then momentarily depresses clutch pedal 45, releasing the manually-operated clutch momentarily, which causes momentary cessation of the tooth pressure exerted by notch 198 of internally notched wheel 89 on tooth 88 of dog 84, whereupon springs 86 immediately pull dog 84 towards its axis of rotation, resulting in seating of tooth 87 in the opposing notch 199 of externally notched wheel 89, thereby changing the driving relation between driving shaft 20, the clutch housing and driven shaft 125 from the intermediate gear speed train to the low speed train.

Release of pressure on clutch pedal 45, after the momentary release of the manually-operated clutch causes said clutch to resiliently connect the motor and driven shaft 125 through the said low speed train, thereby utilizing the mechanical advantage of the low speed train to increase the retrograde torque of the compression of the motor on driven shaft 125.

If, at any time while utilizing the intermediate or "second" speed gear train for retrograde torque inspired by the compression of the motor, the operator desires to again accelerate the vehicle, the following train of events occur.

Release of the brakes of the vehicle and acceleration of the motor immediately remove the retrograde torque operating on gear 90, with the result that gear 90 is impelled to rotate in a counter-clockwise direction. This impulse causes teeth 134 to disengage themselves from teeth 133 by reason of the torque now being counter-clockwise directionally transmitted to driven shaft 125 through the screw threads 96 of hub section 94 and screw threads 97 of shaft 98 instead of clockwise directionally through teeth 133 of ratchet clutch housing 132 and splines 130 between ratchet clutch-carrying housing 132 and flange 129 of driven shaft 125. This, by reason of the fact that the travel of screw threads 96 and screw threads 97, permit a fraction of rotation of gear 90 counter-clockwise in relation to driven shaft 125 not enjoyed by ratchet clutch-carrying housing 132.

This fraction of rotation permits the inclined plane of the ratchet tooth 134, acting on the inclined plane of ratchet tooth 133, to push ratchet tooth 133 and with it clutch-carrying housing 132 rearward to the extent that plunger 136 is raised out of recess 131. At the moment of release of plunger 135 from recess 131, springs 139 immediately force ratchet clutch-carrying housing 132 back to its original position of release. Therefore it will be seen that the positive engagement unidirectionally clockwise between ratchet carrying housing 132 and gear 90 is automatically disconnected upon the application of counterclockwise torque.

When the operator of the vehicle, while utilizing the low speed or "first" gear train for retrograde torque inspired by compression of the motor, desires to re-accelerate the vehicle, the mechanism operates as just described and the acceleration proceeds, utilizing the low speed or "first" gear train until the vehicle has again accelerated to the predetermined level at which the centrifugal force acting upon dog 84 is sufficient to compress springs 86, at which point the operator proceeds to secure the intermediate speed or "second" gear, and high speed or direct drive connection in exactly the same manner as described hereinbefore.

Operation of the device in reverse

Assuming the vehicle is at a standstill with clutch pedal 45 depressed and the motor running at sufficient speed to propel the vehicle in reverse, the device will function in the following manner, at the will of the operator:

By exertion of sufficient pull on pull rod 181 to slide slidable shaft 72 rearward into recess 196, "neutral" is obtained by reason of rearward displacement of shaft 72 serving to disconnect the splined connection 78 between collar 77 and splined hub 76 of gear 69, and to unmesh gear 81 from gear 90 by reason of the fact that collar 77 is prevented from sliding forward on shaft 72 by shoulder 197 of the enlarged forward end of tubular shaft 72.

Thus it will be readily seen that this rearward movement of shaft 72, carrying with it all of the parts mounted thereon rearward of shoulder 197, produces what is conventionally termed "neutral." With this rearward motion of shaft 72 completed, exertion of pull on pull rod 184 of sufficient degree to slide hub 153, integral with reversing gears 174 and 175 rearward on shaft 152, a sufficient distance to cause gear 174 to come to mesh with gear 69 and gear 175 to come to mesh with gear 90, simultaneously sufficient pull on pull rod 177 slides ratchet clutch-carrying casing 132 forward, causing engagement between teeth 133 of the ratchet clutch-carrying housing 132 and teeth 134 of gear 90.

It will be readily seen that the pull on the three pull rods just described has served to establish driving connection through the following gears constituting a reverse gear train, gear 65, gear 69, gear 174, gear 175 and gear 90, together with the unidirectional positive clutching action of ratchet teeth 133 and 134.

Having completed this operation, release of pressure on clutch pedal 45 by the operator of the vehicle permits springs 33 to expand, pulling pressure plate 47 forward, causing resilient engagement between pressure plate 47, clutch plates 55, clutch plates 57 and pressure disk 56, which resilient engagement causes the motor to begin to propel the vehicle backwards through the gear train just described and the unidirectional driving connection of ratchet teeth 133 and 134. When the operator has backed up the vehicle the desired distance and wants to proceed forward again, he brings the vehicle to a stop by application of the brakes and simultaneously depresses clutch pedal 45.

To produce forward driving connections, the operator merely exerts sufficient pushing pressure on pull rod 184 to slide slidable hub 153 with its integral reversing gears 175 and 174 forward sufficiently to unmesh gears 175 and 174 from gears 90 and 69, respectively, and then exerts sufficient push on pull rod 181 to slide slidable shaft 72 forward sufficiently to mesh gear 81 with gear 90 and to connect the splined connection 78 between collar 77 and splined hub 76 of gear 69, after which, release of the pressure on clutch pedal 45, causes engagement of the clutch mechanism previously described as controlled by clutch pedal 45. Forward drive connection in low speed with the motor, is again thus resiliently effected and the vehicle proceeds forward in low gear and henceforth may be operated forward in exactly the same manner as has been described hereinbefore.

In order to avoid excess detail in the drawings which might become confusing, applicant has intentionally omitted the illustration of any means for lubricating the improved power transmission mechanism. It is considered unnecessary to illustrate means for lubrication since such means are well known to those skilled in the art.

It is now manifest that this is an improvement in power transmissions, namely, a device for the transmission of power from a power source such as an engine or a motor to the vehicle, conveyance or machine to be propelled by such a power source, and that it is a power transmission in which the power from the power source to the vehicle, conveyance or machine propelled is delivered through a series of speed changes through the automatic inter-position of constantly meshed gear trains of varying reduction ratios, which inter-position of the various gear trains is effected through the coaction of the velocity of rotation, the torque resistance of the means for propelling the vehicle, conveyance or machine propelled and the torque delivered by the power source, and in which the co-action of the velocity of rotation, the torque resistance of the means for propelling the vehicle, conveyance or machine propelled and the torque delivered by the power source being inter-opposed and inter-controlled in such manner that the velocity responsive means never escape the opposition or control of the torque responsive means and the torque responsive means never escape the opposition and control of the velocity responsive means.

What I claim is:

1. Power transmission mechanism of the character disclosed comprising a threaded driven shaft, a disk in threaded engagement with said shaft and mounted thereon for conjoint rotation therewith, a threaded tubular shaft surrounding said driven shaft slidable thereon and rotatable therewith, a disk carried on said tubular shaft positioned in complementary spaced relationship from the first said disk, both disks having inwardly inclined converging surfaces, a wedge-shaped weight positioned between said converging inclined surfaces for conjoint rotation therewith and radially slidable by centrifugal force for affecting the spaced relationship of the disks, a hub in threaded engagement with said tubular shaft, a second tubular shaft surrounding the first said tubular shaft, a gear train positioned and adapted to transmit driving torque from the second tubular shaft to the threaded hub, manually operable clutch means for connecting the second tubular shaft with a source of driving power, and an automatic clutch positioned adjacent the complementary rotary disks for engagement thereby when said disks move away from each other, and positioned to transmit driving power from a prime mover to the first said tubular shaft and to the driven shaft, the disks being urged toward each other by torque applied to the threaded shafts and away from each other by centrifugal force applied through the intermediary of said wedge-shaped weight.

2. Power transmission mechanism of the character disclosed comprising a threaded driven shaft, a disk in threaded engagement with said shaft and mounted thereon for conjoint rotation therewith, a threaded tubular shaft surrounding said driven shaft slidable thereon and rotatable therewith, a disk carried on said tubular shaft positioned in complementary spaced relationship from the first said disk, both disks having inwardly inclined converging surfaces, a wedge-shaped weight positioned between said converging inclined surfaces for conjoint rotation therewith and radially slidable by centrifugal force for affecting the spaced relationship of the disks, a hub in threaded engagement with said tubular shaft, a second tubular shaft surrounding the first said tubular shaft, a gear train positioned and adapted to transmit driving torque from the second tubular shaft to the threaded hub, manually operable clutch means for connecting the second tubular shaft with a source of driving power, an automatic clutch positioned adjacent the complementary rotary disks for engagement thereby when said disks move away from each other, and positioned to transmit driving power from a prime mover to the first said tubular shaft and to the driven shaft, the disks being urged toward each other by torque applied to the threaded shafts and away from each other by centrifugal force applied through the intermediary of said wedge-shaped weight, and means connected with said manually operable clutch and positioned to be actuated by said separating movement of the disks for releasing the manually operable clutch.

3. Power transmission mechanism of the character disclosed comprising a threaded driven shaft, a disk in threaded engagement with said shaft and mounted thereon for conjoint rotation therewith, a threaded tubular shaft surrounding said driven shaft slidable thereon and rotatable therewith, a disk carried on said tubular shaft positioned in complementary spaced relationship from the first said disk, both disks having inwardly inclined converging surfaces, a wedge-shaped weight positioned between said converging inclined surfaces for conjoint rotation therewith and radially slidable by centrifugal force for affecting the spaced relationship of the disks, a hub in threaded engagement with said tubular shaft, a second tubular shaft surrounding the first said tubular shaft, two gear trains of different ratios positioned and adapted to transmit driving torque from the second tubular shaft to the threaded hub, spring-opposed centrifugal means for alternately effecting engagement of said gear trains, manually operable clutch means for connecting the second tubular shaft with a source of driving power, and an automatic clutch positioned adjacent the complementary rotary disks for engagement thereby when said disks move away from each other, and positioned to transmit driving power from a prime mover to the first said tubular shaft and to the driven shaft, the disks being urged toward each other by torque applied to the threaded shafts and away from each other by centrifugal force applied through the intermediary of said wedge-shaped weight.

4. Power transmission mechanism of the character disclosed comprising a threaded driven shaft, a disk in threaded engagement with said shaft and mounted thereon for conjoint rotation therewith, a threaded tubular shaft surrounding said driven shaft slidable thereon and rotatable therewith, a disk carried on said tubular shaft positioned in complementary spaced relationship from the first said disk, both disks having inwardly inclined converging surfaces, a wedge-shaped weight positioned between said converging inclined surfaces for conjoint rotation therewith and radially slidable by centrifugal force for affecting the spaced relationship of the disks, a hub in threaded engagement with said tubular shaft, a second tubular shaft surrounding the first said tubular shaft, a gear train positioned and adapted to transmit driving torque from the second tubular shaft to the threaded hub, manually operable clutch means for connecting the second tubular shaft with a source of driving power, selectively shiftable means for transmitting reverse driving torque to the driven shaft, and an automatic clutch positioned adjacent the complementary rotary disks for engagement thereby when said disks move away from each other, and positioned to transmit driving power from a prime mover to the first said tubular shaft and to the driven shaft, the disks being urged toward each other by torque applied to the threaded shafts and away from each other by centrifugal force applied through the intermediary of said wedge-shaped weight.

5. Power transmission mechanism of the character disclosed comprising a threaded driven shaft, a disk in threaded engagement with said shaft and mounted thereon for conjoint rotation therewith, a threaded tubular shaft surrounding said driven shaft slidable thereon and rotatable therewith, a disk carried on said tubular shaft positioned in complementary spaced relationship from the first said disk, both disks having inwardly inclined converging surfaces, a wedge-shaped weight positioned between said converging inclined surfaces for conjoint rotation therewith and radially slidable by centrifugal force for affecting the spaced relationship of the disks, a hub in threaded engagement with said tubular shaft, a second tubular shaft surrounding the first said tubular shaft, two gear trains of different ratios positioned and adapted to transmit driving torque from the second tubular shaft to the threaded hub, spring-opposed centrifugal means for alternately effecting engagement of said gear trains, manually operable clutch means for connecting the second tubular shaft with a source of driving power, selectively shiftable means for transmitting reverse driving torque to the driven shaft, and an automatic clutch positioned adjacent the complementary rotary disks for engagement thereby when said disks move away from each other, and positioned to transmit driving power from a prime mover to the first said tubular shaft and to the driven shaft, the disks being urged toward each other by torque applied to the threaded shafts and away from each other by centrifugal force applied through the intermediary of said wedge-shaped weight.

EDWIN S. SEGARD.

REFERENCES CITED

The following references are of record in the file of this patent:

UNITED STATES PATENTS

| Number | Name | Date |
|---|---|---|
| 1,784,793 | Prior | Dec. 9, 1930 |
| 1,864,522 | Bartelme | June 28, 1932 |
| 2,056,050 | Harris | Sept. 29, 1936 |
| 2,086,600 | Burtnett | July 13, 1937 |
| 2,108,105 | Cotterman | Feb. 15, 1938 |
| 2,136,811 | Burtnett | Nov. 15, 1938 |
| 2,172,991 | Segard | Sept. 12, 1939 |
| 2,210,668 | Hopkins | Aug. 6, 1940 |
| 2,218,530 | Hall et al. | Oct. 22, 1940 |
| 2,237,025 | Cotterman | Apr. 1, 1941 |

FOREIGN PATENTS

| Number | Country | Date |
|---|---|---|
| 460,828 | Great Britain | Jan. 29, 1937 |